C. H. SCHMALZ.
FLUID FLOW CONTROLLING VALVE.
APPLICATION FILED DEC. 4, 1917.
1,278,760.
Patented Sept. 10, 1918.
2 SHEETS—SHEET 1.
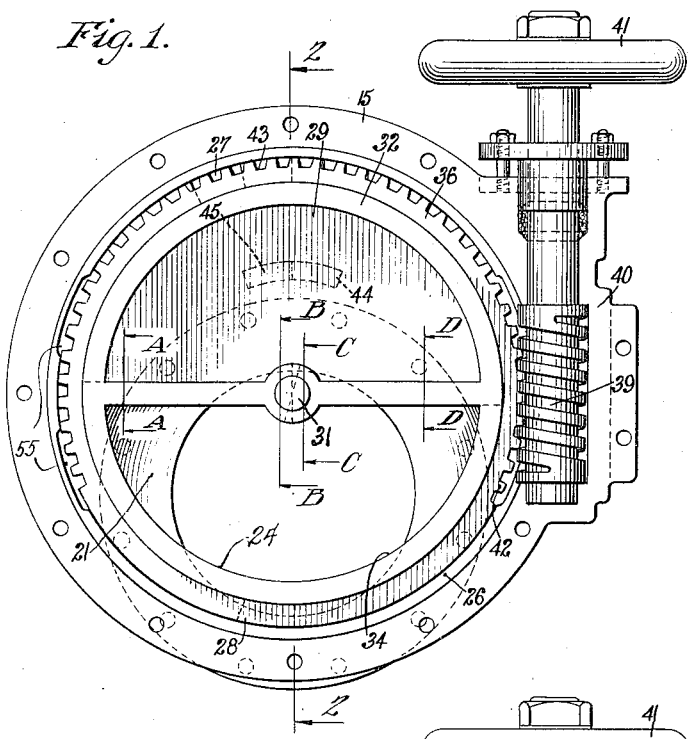
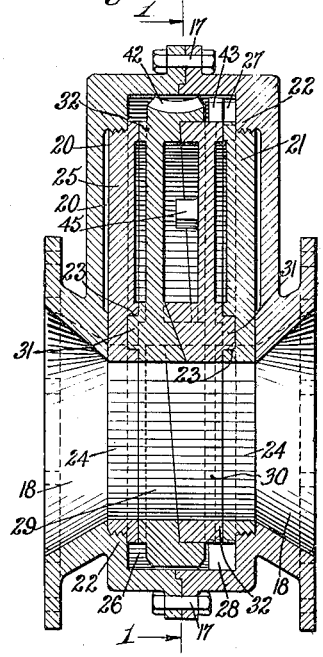
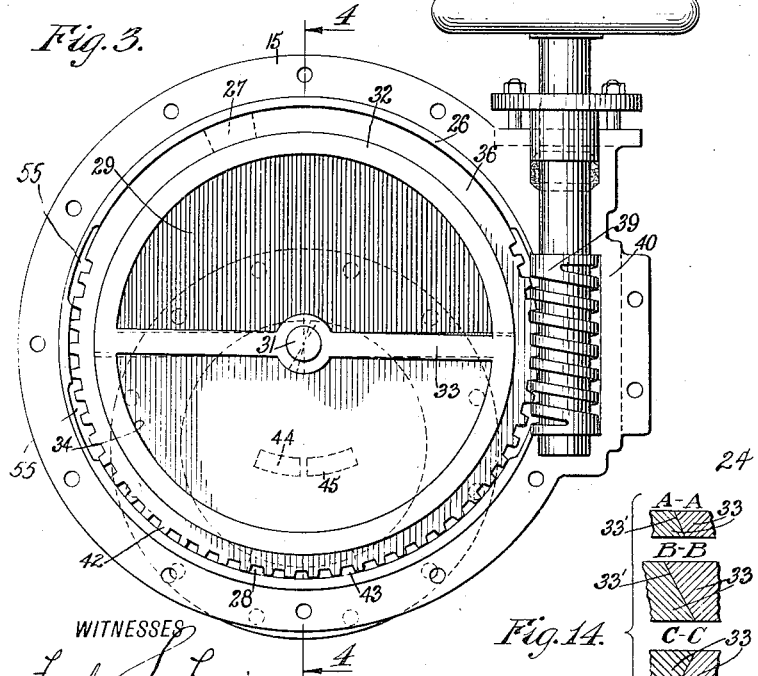
WITNESSES
INVENTOR
C. H. Schmalz
BY
ATTORNEYS

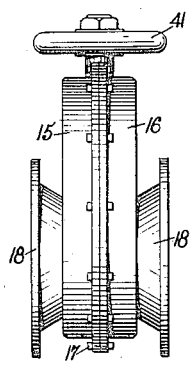
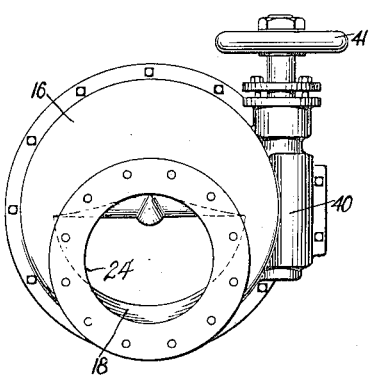
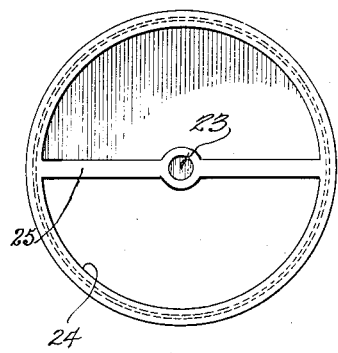
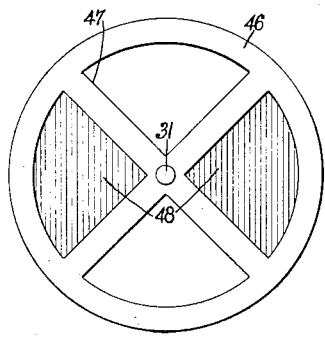
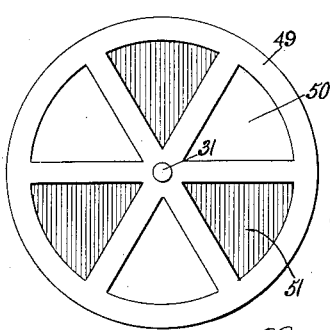
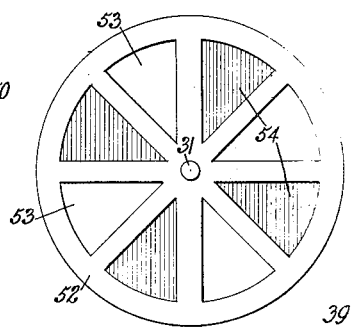
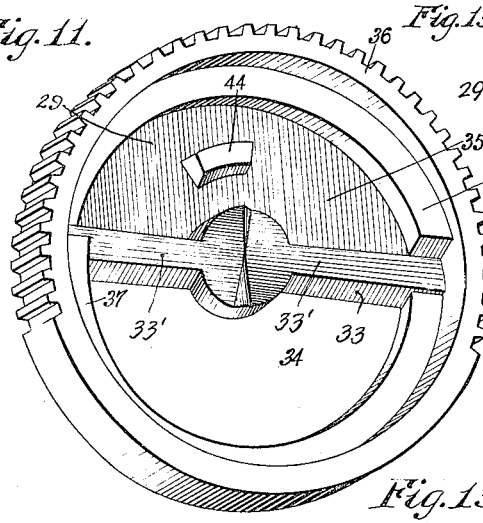
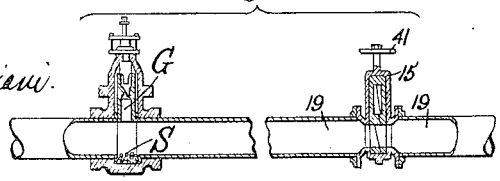

UNITED STATES PATENT OFFICE.

CHARLES H. SCHMALZ, OF POMPEYS PILLAR, MONTANA.

FLUID-FLOW-CONTROLLING VALVE.

1,278,760.

Specification of Letters Patent.   Patented Sept. 10, 1918.

Application filed December 4, 1917. Serial No. 205,301.

*To all whom it may concern:*

Be it known that I, CHARLES H. SCHMALZ, a citizen of the United States, and a resident of Pompeys Pillar, in the county of Yellowstone and State of Montana, have invented a new and Improved Fluid-Flow-Controlling Valve, of which the following is a full, clear, and exact description.

This invention relates to the distribution and control of the flow of fluids and has particular reference to valves employed for the control of the flow of fluids through orifices, pipes, and the like, such as water, steam, gas, air, etc.

Among the objects of the invention is to provide a valve calculated to be used as a substitute for the well known and more or less commonly used slide or gate, globe type, and similar valves.

Another object of the invention is to provide a valve so constructed that it is impossible for sand, pebbles, gravel, other heavy particles, and the like, or other extraneous matter to settle or accumulate in the pits or pockets in the casing, and so prevent the proper operation or closing or opening of the valve, in whatever position the valve might be installed.

A still further object of the invention is to provide a valve in which the movable portion is operated in such a manner as to greatly facilitate the manipulation thereof with respect to the power required to open or close an ordinary valve.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a face view of the valve mechanism in operative position, indicating one of the power means for moving the valve, and indicating the valve casing separated on the line 1—1 of Fig. 2.

Fig. 2 is a vertical sectional view on the line 2—2 of Fig. 1 with the casing complete.

Fig. 3 is a view corresponding to Fig. 1 but with the valve closed, the casing being parted on the line 3—3 of Fig. 4.

Fig. 4 is a vertical sectional view on the line 4—4 of Fig. 3.

Fig. 5 is a rear elevation of the casing complete;

Fig. 6 is a face view of the same looking toward the left in Fig. 5.

Fig. 7 is an inner face view of one of the valve seats held in stationary position in one side of the casing.

Figs. 8, 9 and 10 are diagrams indicating multiple port valves.

Figs. 11 and 12 are inner perspective face views of the coöperating rotary valve members showing especially the spiral and warped coöperating surfaces.

Fig. 13 is a detail diagram showing the comparative effects of the old and new type of valves with respect to the accumulation of obstacles in the bottom of the valve casing, pit or pocket in the old type, when the valve is installed as shown.

Fig. 14 is a series of sectional diagrams on the lettered lines of Fig. 1, showing the warping of the facets.

Figs. 15 and 16 are detail views in diagram indicating the modified forms of gearing means for rotating the movable parts of the valves.

Referring now more particularly to the drawings for a full explanation of the preferred embodiment of the invention, I show at 15 and 16 the two main portions of the casing, split at right angles to the direction of the flow of fluid, having coöperative flanges whereby the casing may be secured in complete closed position by means of removable fasteners 17 of any suitable nature, or otherwise. Or the casing may be split parallel, or otherwise, to the direction of the flow of fluid and the portions secured by means of male and female threaded members or otherwise. Each casing part is provided mainly at one side of the longitudinal center thereof with a throat portion 18 serving two functions, namely as means for attachment of the casing to a main or pipe 19, as by a flange extending laterally from the throat, male or female threads or otherwise, and secondly to provide a suitable approach to the valve mechanism proper.

The inner face of each casing part 15 or 16 is recessed or countersunk adjacent to the inner end of the conical throat portion forming a cavity 20. In the cavity 20 of the member 15 is located a stationary valve seat in the nature of a disk 21 having its periphery threaded, or otherwise fastened, into the shoulder portion 22 surrounding the cavity 20. The inner face of the valve seat or disk 21 is flat, smooth and unbroken save for a central bearing socket 23 in the center, and a relief surface below the actual seat areas to facilitate machining, etc., and at one side of said central bearing socket being provided with a passageway 24 located longitudinally in alinement with the throat 18 and pipe connections. In the other casing portion 16 is located a similar valve seat disk 25 having a similar bearing socket, surface relief and passageway. The main casing is enlarged forming a cavity 26 adjacent to its flanged portion and surrounding the peripheries of the two stationary disks 21 and 25. There are provided, however, adjacent to the top and bottom of the casing portion 15, a pair of lugs 27 and 28 projecting into said cavity. Obviously, however, I will have it understood that while I may refer herein to the "top" and "bottom" of the casing, these terms are to be treated as merely illustrative and not as limitations, as the valve is adapted to operate in any position with respect to the vertical.

The movable valve mechanism comprises two valve disks 29 and 30, see Figs. 11 and 12. Each of these disks has a central bearing trunnion at 31 seated in the socket 23. The two trunnions are in axial alinement with each other and hence the two disks are adapted to both rotate around the same fixed axis, said axis constituting the longitudinal center of the casing. The outer face of each valve disk includes a rim 32 lying in the plane perpendicular to the axis of the disks and adapted to coöperate directly and tightly with the inner face of the adjacent stationary valve seat or disk 21 or 25. This rim portion, as indicated especially in Figs. 1 and 3, also includes a diametrical bar 33 surrounding the trunnion 31. These features indicated at 32 and 33 serve to constitute a means to provide a positively sure fluid seal between each rotary disk member and its coöperative stationary disk when the valve is closed. It will be noted also that in the preferred form of the invention the rotary disks are each provided with a passageway 34 at one side of the center and with an imperforate web 35 at the other side of the center. However when the multiport designs are used as shown in Figs. 8, 9 and 10 parts will be arranged accordingly.

I will now describe more specifically the construction and operation of the rotary valve disks having reference particularly to the perspective views thereof. The disk 29 is provided with a flange 36 projecting toward and embracing the outer edge portion of the other disk 30. This overlapping portion, however, is of minor importance in comparison with features now to be described. The disk 29 is provided with two spiral faced cams 37 surrounding the passageway 34 and the web 35 on the inner face of the disk and lying just within the flange 36. These spiral cams 37 extend circumferentially both in the same direction and coöperate simultaneously upon a pair of similarly shaped cam faces 38 carried by the disk 30 and which project within the flange 36. The two cams 37 or 38 of each valve disk, like the passageways 34 and webs 35, lie on opposite sides of the diametrical bar 33. I show only two spiral faced cams 37. The number and inclination of the cam faces will depend upon conditions as it may be found preferable to employ one, two, three or more cam faces, for each disk, of any required length and any required or suitable inclination.

In addition to the two spiral surfaces formed on each of the disks as already described, the bar portion 33 of each disk is provided on its inner face with two facets 33'. Each pair of facets 33' are in general inclined with respect to each other as viewed toward the center of the disk. More accurately stated, however, each of the facets constitute a warped or twisted surface, and while the general inclination of each facet corresponds to the inclination of the cam surface 37 adjacent thereto, the facet is so twisted or warped that the throw or pitch of the surface is greatest adjacent to the center of the disk as a whole, the reason for which will appear more fully in connection with the description of the operation below. See Figs. 1 and 14. I show only two warped facets 33' on each disk. The number and inclination of these facets will depend upon conditions, as it may be found preferable to employ one, two, three or any number of facets, depending upon the number of ports employed, etc., and of any inclination that may be required.

Any suitable means may be provided to rotate the rotary disks, such as spur pinion and gear or train (Fig. 15) bevel pinion and gear or train (Fig. 16), etc. But to this end I prefer to employ a worm 39 journaled in the casing between the two main portions thereof in a bearing box 40 and having a hand wheel 41, or its equivalent, connected to the exposed end of the worm shaft. The bearing box 40 holds the shaft from endwise movement and hence rotation of the shaft and worm will cause the pitch of the worm to act through the worm teeth 42 formed on the flange 36 of the disk 29, to rotate immediately the disk 29. In their normal nested position the two rotary valve disks, when the valve is open, fit loosely between the two seats 21 and 25 but with very slight clearance, and only just sufficient to allow the disks 29 and 30 to slide between the stationary seats 21 and 25, when operated. The fit just referred to is such that while the disk 29 is rotated positively by means of the worm toward the closing position the spiral cams 37 of the disk 29 bearing against the cams 38 of the disk 30, and the warped or twisted facets 33' of the disk 29 bearing against the corresponding facets of the disk 30, will cause the disk 30 to rotate without material resistance, although the inclination will be to separate the two rotary disks to the limit of the space between the stationary seats, during this action. When, however, the disks have thus been given a half rotation, a lug 43 formed on the periphery of the disk 30 comes into engagement with the lug 28 above described whereby the rotation of the disk 30 is immediately and positively stopped, with the passageway 34 thereof registering with the passageway 24 of the adjacent stationary disk 21. The passageways 34 in the disks 29 and 30, however, are of the same size, dimension, and shape as the passageways 24 in the seats 21 and 25, and are of an area equal to or larger than the area of the main or connecting pipe 19 or other duct, so as to insure that no obstruction of the flow of fluid through the main or connecting pipe 19 will take place when the valve is fully open. In the multiport design the aggregate areas of the ports shall be equal to or be more than the area of the main or connecting pipe 19, etc., as explained above. It follows that a partial rotation of the rotary disks will restrict the flow of fluid in proportion to the rotation thereof. The moment the lug 43 impinges against the lug 28 the rotation of disk 30 is stopped, but the disk 29 is free to continue its rotation to a slight degree so as to bring the warped surfaces or facets 33' of one disk into direct wedging coöperation with similar surfaces of the other disk, and also the spiral cams 37 and 38 into direct wedging coöperation with one another, thus causing the disks 29 and 30 to separate and causing the two bar portions 33 and the rim portions 32 of the rotating disks to come forcibly against the corresponding seats of the stationary disks or valve seats 21 and 25. This slight independent action of the disk 29 is indicated in the straight dotted lines in Fig. 3 adjacent to the bar 33. Obviously the extent of such rotation or independent action of disk 29 is in practice very slight, inasmuch as the clearance between the rotary disks and the stationary disks in practice is very slight. It will now be noted that the reason for the warping of the facets 33' is that while the greatest throw or pitch of the cam action of these facets is greatest at the hub or central portion of the disks, the extent of circumferential movement at such portion is relatively much slighter than at the outer portion. Therefore, by providing the warping or twisting of such facets the wedging action along all portions of the bars 33 will be practically the same even though the circumferential movement is much greater at the ends of the bars 33 than toward the hubs. It will thus be seen that all of the bearing or sealing portions of the rotary disks are held snugly and squarely against the stationary disks when the valve is closed. The inner faces of the webs 35 are provided with lugs 44 and 45 respectively, which are adapted to coöperate with each other, one lug abutting against the other circumferentially while the valve is open. The primary object of these two lugs is to cause the disk 30 to be positively moved to its open position when the disk 29 is actuated to return it to open position, hence the lugs are so related to each other that when the valve is being closed the lug 44 moves in advance of the lug 45. Since, however, it is provided that the disk 30 is rotated with comparative ease or freedom toward its closed position by virtue of the cams 37 and 38 and the warped or twisted facets 33', the lug 45 will follow very closely after the lug 44 until the rotation of the disk 30 is stopped by the lug 43 impinging against the fixed lug 28. When, however, the disk 29 rotates slightly beyond the rotation of the disk 30 the lug 44 correspondingly moves away from the other lug 45 as indicated in dotted lines in Fig. 3. When the valve is reversed, however, to its open position by means of the worm acting on the disk 29 thus causing the disks 29 and 30 to contract slightly between the seats 21 and 25 by virtue of the reverse action of the cams and warped or twisted facets, the lug 44 will strike immediately against the lug 45 and so carry with it around the axis of the valve the disk 30 to open position. The amount of this contraction and expansion of the disks 29 and 30 between the seats 21 and 25 is governed by the clearance between lugs 44 and 45 and the cams 37 and 38 and the warped or twisted facets 33'. This reverse action or rotation of the valve disks may continue until the lug 43 strikes against the fixed lug 27. The impinging of the lugs 44 and 45 and lugs 43 and 27 insures the registering of the openings in the movable or rotary disks with the openings in the stationary seats in open position. The impinging of lugs 43 and 28 and the spiral cams 37 and 38 and the warped or twisted facets 33' insures the registering of the valve seat faces to make a surely tight joint between the rotary disks and the stationary seats in closed position.

It is evident that the ends of the spiral cams 37 and 38 may be adjusted so as to eliminate lugs 44 and 45, but in practice it will be easier to adjust the lugs 44 and 45 than the ends of the cams, in order to have the above desired effect.

From the foregoing it is evident that the seats in the casing and of the rotary disks are subjected to a rotary and combined sliding and squeezing action when the final closing or the initial opening action takes place. This rotary sliding and squeezing action between the surfaces mentioned, not only keeps the seats clean and in good condition but is necessary to insure a complete and reliable seal for the control of the fluid flow, whether liquid or gaseous, of the fluids conducted and is the essential reason for the universal and general application of my valve.

It will be observed that all of the movable members of the valve mechanism are located within the casing, so that they are at all times protected from the flow of fluid conducted and any sand, gravel, sediment, or other extraneous matter or other heavy particles which might be contained in the fluid. It will also be observed that my valve does not possess any pit, pocket, or opening in the casing exposed to sand, gravel, or other heavy particles which would accumulate and fill any pit, pocket or opening exposed, and so interfere with the movement of the valve or to the complete shutting off of the flow of fluid when the valve is moved to or toward the closed position, as is the case with the old type of valve, no matter in what position my valve may be installed.

Fig. 13 is submitted as an indication in diagram of the fact that in the case of an ordinary gate valve G in order to provide a tight closing of the valve the lower end thereof must be forced into a pocket which, when the valve is open, is directly exposed to the current of fluid passing through the mains or connecting pipes and hence constituting in effect a trap for sand, gravel, pebbles, stones and the like, as indicated at S. No such pocket, pit, or opening being present in my valve, there is no possibility for any such accumulation. So far as any pocket, pit, or cavity in the casing is concerned the same is as completely avoided when my valve is open as when it is closed, no matter in what position the valve may be installed.

Instead of providing a single passageway through the movable and stationary disks it is feasible, if desired, to provide two, three, or more openings in each disk as indicated in the diagrams of Figs. 8, 9 and 10. The extent of rotation in each case would be varied according to the number of openings. In Fig. 8 the disk 46 is indicated with two openings 47 and two webs 48 arranged in alternation. In Fig. 9 the disk 49 has three openings 50 and three webs 51, and in Fig. 10 I show a disk 52 having four openings 53 and a similar number of webs 54.

The rotary disks 29 and 30 will be fit accurately within the casing 15 and 16, but in order to reduce the turning effort, especially in the larger sizes of valves, on the hand wheel 41 or other device for operating the valve mechanism, undercuts 55 will be provided. These undercuts 55 may be of any required length or number or in any suitable location with respect to the periphery of the inside of the casing. It may be necessary to provide rollers, balls or other anti-frictional device for the reduction of the operation effort, especially in the extreme sizes of valves, due to the weight of the rotary disks.

In practice, two distinct types of gate valves are in use, viz., the single and double gate types. Should it be found necessary or desirable for me to provide a valve of my improved design which will answer the purpose and is to be installed under conditions of the single gate type of gate valve, it is only necessary to omit the rotary disk 30, and incorporate the cam faces 38 and the warped facets 33' in one half of the casing, the other half of the casing will be provided with the usual stationary disk 21 or 25 as the case might be. All other conditions will remain the same and as explained above.

I claim:

1. The herein described valve mechanism comprising in combination a casing having spaced valve seats arranged therein parallel to each other, a pair of rotary valve disks in the space between the valve seats and adapted to make tight joints therewith respectively, said valve seats and valve disks having passageways adapted to register with one another when the valve is open, and means to rotate both of the valve disks around the same fixed axis.

2. In a valve construction, the combination with a casing and a pair of spaced valve seat members carried therein, of disk shaped valve means located in the space between said seat members and journaled for rotation around a longitudinal central axis coinciding with the axis of the casing and valve seat members, said casing having alined passageways on one side of said axis and the movable valve means having a similar passageway alining with the aforesaid passageways when the valve is open, and means acting upon the periphery of the movable valve means to move the same into open or closed position around said central axis, said moving means serving to force the valve means snugly against both seat members when in closing action.

3. In a rotary disk valve structure, the combination with a casing having fitted therein two stationary disk shaped valve seats having smooth faces arranged in spaced parallel planes, said valve seats being located in an enlargement in the casing forming a cavity, a pair of rotary disk valve members located in the space between said seats and projecting radially beyond the same into said cavity, said valve disks having smooth outside faces coöperating with the smooth faces of the valve seats, means to journal the valve disks in the valve seats whereby the disks are held for rotation around a longitudinal fixed axis, and means to positively rotate the valve disks around said fixed axis.

4. In rotary valve mechanism of the class set forth, the combination with a casing having an interior cavity and a pair of valve seats fixed in said casing in spaced parallel relation to each other, of a pair of rotary valve disks located in said cavity and lying between said seats, means journaling the rotary disks in the valve seats for rotation around a fixed axis common to all of the disks and seats, means to rotate the valve disks around said fixed axis, and means serving to force the disks away from each other in the direction of said axis whereby a tight connection is effected between said rotary disks and both of said seats.

5. In rotary valve mechanism, the combination with a casing and a pair of spaced valve seats fixed therein, said seats being provided with passageways, and each passageway being arranged eccentric to the seat provided therewith, of a pair of valve disks located in the space between the seats and journaled for rotation around a fixed axis coinciding with the center of the seats, said valve disks being provided with passageways adapted in open position of the valve to register with the passage-ways aforesaid, means to rotate the disks, and means acting to force the disks apart and into close sealing contact with both of the respective seats when the valve is closed.

6. In rotary valve mechanism, the combination with a valve casing having a cavity therein and pipe connections with the casing, the cavity extending below the passage-way from one pipe connection through the casing to the other pipe connection, of a plurality of rotary valves journaled for rotation around the same fixed axis parallel to the axis of the pipe connections, said valves being provided with passageways adapted to register with the passageway through the casing but being so constructed as to prevent sand or other heavy particles from collecting in said cavity in all positions of the valves, means to rotate the valves, and means acting positively upon the valves serving to automatically seal the joints between the respective valves and the casing on opposite sides of the valves when the valves are rotated to closed position.

7. In rotary valve mechanism, the combination with a casing having a cavity therein, of a pair of coöperating valve disks located in said cavity and adapted for rotation around a common fixed axis, one of the disks having a flange overlapping the periphery of the other disk, the abutting portions of the disks being provided with a plurality of spiral cams, means acting upon the overlapping flange portion of one disk serving to rotate the same, and means auxiliary to and coöperating with said cams serving to cause the disks to be forced apart in a direction parallel to said axis as a result of the closing rotation of the disks.

8. In rotary valve mechanism, the combination with a casing having a central cavity, and a pair of disk seats fixed within the casing in spaced relation to each other on opposite sides of the cavity, of a pair of rotary valve disks located between said seats and projecting at their peripheries beyond the same, the opposite outer faces of the disks conforming to the inner faces of the seats, means to rotate the disks, means to positively limit the rotation of one of the disks, and means to cause the disks to be forced away from each other into sealing engagement with the seats while the one disk is permitted to rotate beyond the disk that is limited in its rotation.

9. In a rotary valve device, the combination of a casing, a pair of coöperating valve disks journaled for rotation around the same axis within the casing, power means acting directly upon one of the disks, means between the disks to cause the rotation of the one disk to act to rotate the other, means to positively limit the extent of rotation of said other disk, and devices acting between the two disks and having coöperating warped surfaces serving to cause all parts of the two disks to separate uniformly and forcibly to make sealing engagement with the casing when the positively rotated disk rotates slightly beyond the one that is limited.

CHARLES H. SCHMALZ.